United States Patent [19]
Collins et al.

[11] 3,890,049
[45] June 17, 1975

[54] GLOSSMETER FOR PROVIDING A LINEAR RESPONSE CORRESPONDING TO TRUE GLOSS READINGS

[75] Inventors: Donald S. Collins, Bridgton, Maine; Patrick J. Peoples, Intervale, N.H.

[73] Assignee: Howell Laboratories, Inc., Bridgton, Maine

[22] Filed: Sept. 17, 1973

[21] Appl. No.: 397,993

[52] U.S. Cl. ............... 356/199; 250/227; 250/559; 350/63; 356/209
[51] Int. Cl.... G01n 21/18; G01n 21/30; G01n 21/48
[58] Field of Search ............ 356/199, 200, 209–212, 356/207; 350/63; 250/227, 559, 561, 571

[56] References Cited
UNITED STATES PATENTS

| | | | |
|---|---|---|---|
| 2,215,211 | 9/1940 | Devol | 356/212 |
| 2,546,450 | 3/1951 | Hunter | 356/212 |
| 3,765,776 | 10/1973 | Bravenec | 350/227 |

Primary Examiner—Vincent P. McGraw
Attorney, Agent, or Firm—Richard L. Stevens

[57] ABSTRACT

A glossmeter which includes an optical head, designed to conform with TAPPI Standard 480, and an electrical console connected to the optical head by fiber optics. The optical head transmits signals corresponding to the gloss of a surface to the console. When the surface is that of a vibrating paper web, only those signals which correspond to the gloss of the surface in the measurement plane are selected by the electrical console for recording. A purge gas is introduced into the optical head to prevent the accumulation of particulate matter on the lens surface.

25 Claims, 8 Drawing Figures

PATENTED JUN 17 1975

3,890,049

SHEET 1

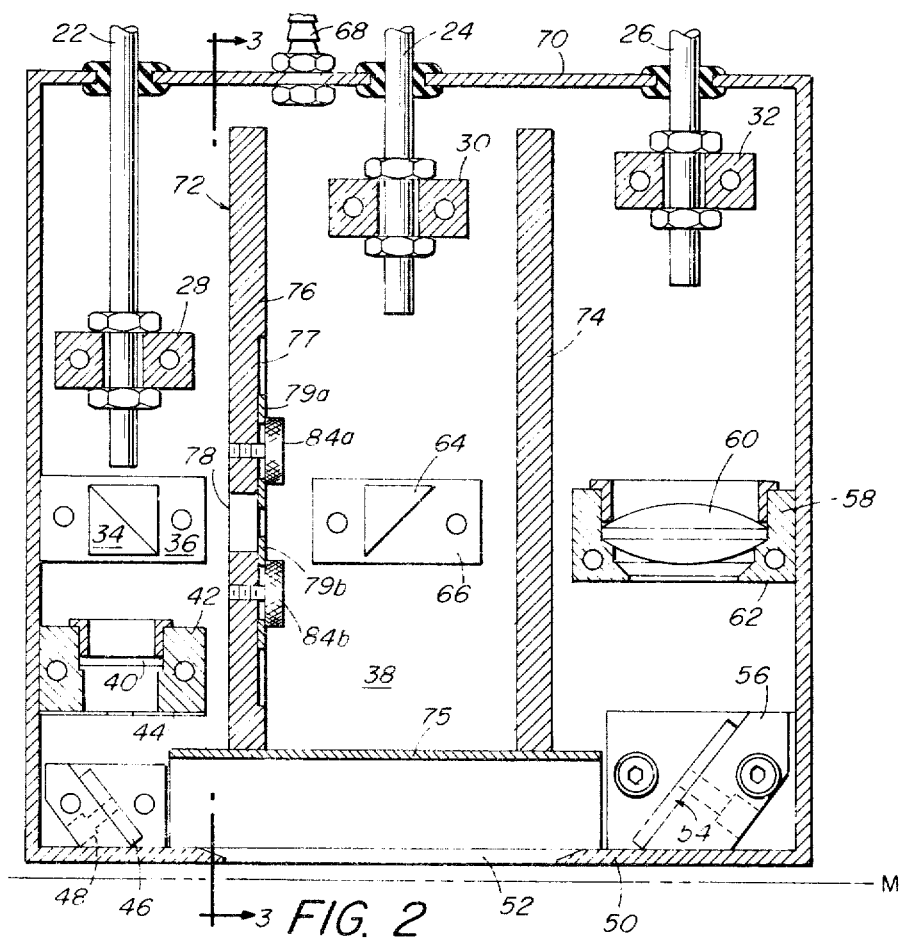
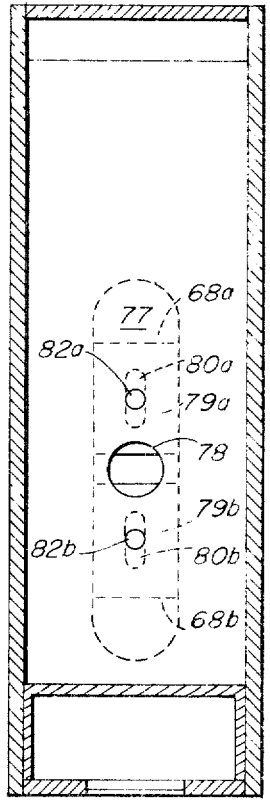
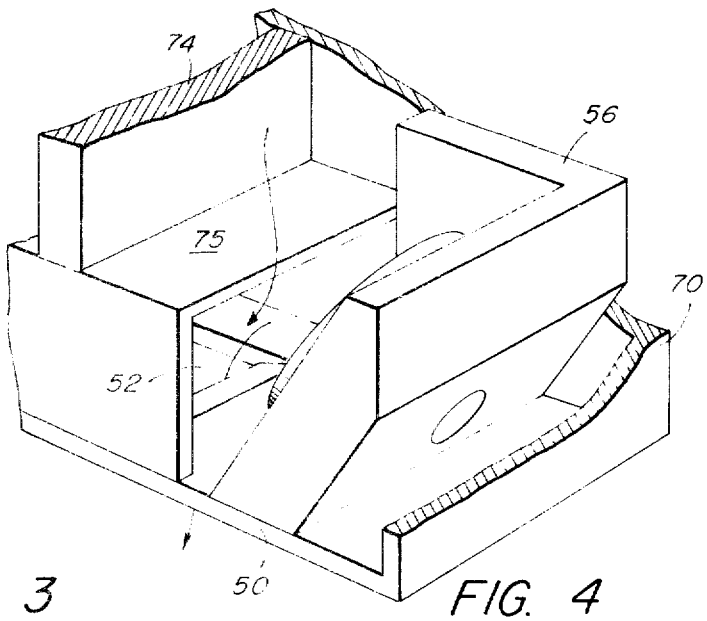

GLOSSMETER FOR PROVIDING A LINEAR RESPONSE CORRESPONDING TO TRUE GLOSS READINGS

BACKGROUND OF THE INVENTION

In the paper industry, several tests are preformed on paper and measurements made to determine the suitability of the paper for its intended purpose. Such measurements include tensile strength, flexibility, tear resistance, thickness, and gloss measurement.

The gloss measurement may be defined as the degree to which a surface approaches a perfect mirror in its capacity to reflect incident light. Surface reflectance is commonly at a maximum in or near the geometric directions in which a plane mirror would reflect light. Specular gloss is related to the extent to which a surface reflects light in a mirror-like fashion; it is proportional to the fraction of an incident beam of light reflected by a surface under specified conditions of illumination and viewing.

The primary method for measuring the specular gloss of paper at 75° (15° from plane of paper) is widely used as a partial measure of the surface quality and shiny appearance of paper. Its chief application is for coated papers, although it may be used for uncoated papers. The Technical Association of the Paper and Pulp Industry (TAPPI) has developed a specification for measuring specular gloss, TAPPI Standard 480, entitled "Specular Gloss of Paper and Paper Board at 75°."

In the paper industry today, particularly where a measurement of a gloss of coated papers is concerned, various instruments are available attempting to conform with TAPPI Standard 480. One commercially available unit which is illustrative of those commonly used provides a complete photoelectric sensing unit which is mounted over a moving web of paper and a sensitive electronic measurement unit that receives and records a photoelectric signal received from the sensing unit.

The sensing unit contains all the optics and electric circuitry necessary to convert the optical signal to an electrical signal. Since the unit must be spaced apart from the moving web of paper a fixed distance in order to define the specimen or measurement plane, the entire unit is rigidly mounted. This means that the entire unit, including all electrical components, is subjected to the shock and vibration of the structure to which it is secured, which in turn, of course, is subject to all vibrations of the operating machine. At the bottom of the unit feet are secured and contact the moving web in an attempt to minimize the web flutter. Web flutter may be defined as the vibration of the sheet in a nonuniform pattern which is inherent in the continuous movement of the paper from one roll to another. Web flutter is distinguished from the actual wave motion of an entire sheet of paper passing from roll to roll, where not unusually one half wave length will be approximately the length of the paper between rolls. That is, the web flutter should be distinguished from the long continuous waves by which the sheet of moving paper is characterized when moving from one roll to the other.

The instrument briefly mentioned above typically contains two windows to protect the lenses of the optical system. The light energy is condensed by the lens, strikes a mirror, passes through the window, strikes the surface of the moving paper, and passes through a window back to a mirror and to a receptor. At the same time, a reference beam is passed directly from one window to the other to a second receptor. The intent of passing both the reference beam and measuring beam through the windows is to insure that as dust, clay, and other particulate matter accumulates on the windows that any error introduced will be uniform in that the measuring beam is calibrated against the reference beam so that a true reading will still be generated. However, there is no assurance that the degree of dust on both windows is the same or that the amount of dust upon various locations of the window is the same. The windows must be used to protect the optical and electrical portions of the instruments from additional accumulations of dust which would be injurious to the instrument.

As set forth in the TAPPI Standard specification, it is desirous that the angle of incidence on the reflective surface being measured and the location of said surface remain constant. This is no problem in the laboratory. However, when a continuous measurement of a moving web is being made, because of the web flutter the web continuously moves into and out of the predetermined measurement plane, and the angle of incidence also varies. When measuring a continuously moving web, the light energy falling on the receptors and the receptors used before the present invention cannot respond to these variations so that the output of the receptors is proportional to the time average of the apparent gloss values. This is why the aforementioned feet are used to immobilize the paper in the measurement plane. Further, the outputs of existing glossmeters are not linear, but vary as a function of geometry and receptor.

Therefore, there exists a need in the industry today for a glossmeter, and particularly a glossmeter for measuring spectral gloss, which can eliminate the problems of dust and clay interfering the transmission of light to insure that no error is introduced into the system, and additionally can provide a true linear signal which corresponds to the measurement of the gloss when the surface of the web is in the measurement plane; in other words, to record only those measurements that are at the proper distance from the aperture of the optical head.

SUMMARY OF THE INVENTION

The present invention is directed to an apparatus and method for measuring the shiny or lustrous appearance of a surface. More particularly, the present invention includes a method and apparatus for measuring the gloss of a surface by the degree of radiant energy which is transmitted to and emerges from the surface to be measured.

The invention broadly comprises an optical head having an optical system, which system defines a measurement plane. A source of radiant energy such as light energy is formed into a beam, passes through the optical head, is reflected from the surface to be measured, and passes back into the optical head. The energy emerging from the sample is received by a suitable receptor and a signal generated. In one aspect of the invention, where the signal represents the gloss measurement of a continuously moving web, the surface of which passes into and out of the measuring plane, only those measurements corresponding to the true gloss reading are processed to provide a linear response. This signal processing eliminates signal variations caused by web flutter.

A second aspect of the invention includes a device and method of purging the optical system of a glossmeter used for gloss measurement. The purging eliminates or minimizes the coating and accumulation of dust, clay, or particulate matter on lenses, windows, etc., of the instrument. The device and method may include a baffling system structured to control the flow of a purge gas through the meter to insure that no dust accumulates on any part of the measuring components. In another aspect of the invention, an optical head is provided wherein the lenses and mirrors in the optical system of the preferred embodiment are structured to conform with TAPPI Standard 480, hereby incorporated by reference.

The optical head may be used with or without the purge gas and the signal processing. The signal processing unit of the invention may be used with conventional glossmeters to compensate for the variation in signals received because of web flutter. Also, the concept of employing purge gas in combination with the optical system to eliminate dust may be used with convention glossmeters.

In the preferred embodiment, the invention comprises two basic modules, the optical head and the electrical The the optical head includes an optical system, i.e., mirrors and lenses, secured in the head. The optical system defines a measuring plane. The head is rigidly secured over the moving web such that the surface of the moving web, when static, lies in the measuring plane. To provide communication between the optical head and the electrical console, fiber optics are used to transmit the energy to the optical head and to transmit the measuring signal and reference signal from the optical head back to the electrical console. An inlet is disposed in the optical head to allow for the introduction of a purge gas therethrough. Also, a variable slit is provided in the optical head, whereby the electrical components corresponding to the reference and measuring signals are optically balanced. In the preferred embodiment, apertures as set forth in the above TAPPI references are used, and the angles in our design are fixed at alignment.

Fiber optics are used to interconnect the optical head and the electrical console. The unit thus can be nonresiliently mounted close to the paper. The fiber optics insure resilient coupling of the optical signals to and from the electrical console, and the electrical console can be resiliently mounted. This prevents damage to the electrical components.

The electrical console includes a lamp system, a photocell module, and a signal processing module. The lamp system includes two lamps; in the event that one lamp expires, the second lamp is actuated automatically, thereby insuring that on a continuous run no shut-down is required to replace a lamp.

The photocell module includes a balanced input circuit to a differential amplifier, so that any imbalance is due to the signal. The input offset voltage of the amplifier is cancelled automatically as the reference signal is adjusted to balance the signal from whatever standard is used.

The signal processing module is designed to take advantage of the fact that every time the surface of the fluttering web passes through the measuring plane, the output from the photocell module will pass through a maximum value, which corresponds to the gloss of the paper in the measuring plane. The maximum value of this peak is selected and held until the next time the paper passes through the measuring plane, at which time a new maximum value is generated. The signal processing module thus generates only signals which reflect a true gloss measurement.

BRIEF DESCRIPTION OF THE DRAWINGS

FIG. 2 is a front elevation and partly sectional view of the optical head;

FIG. 3 is a sectional view of the optical head taken along lines 3—3 of FIG. 2.

FIG. 4 is a partial isometric view of the purge gas flow path in the optical head;

DESCRIPTION OF THE PREFERRED EMBODIMENT

Figure 1:
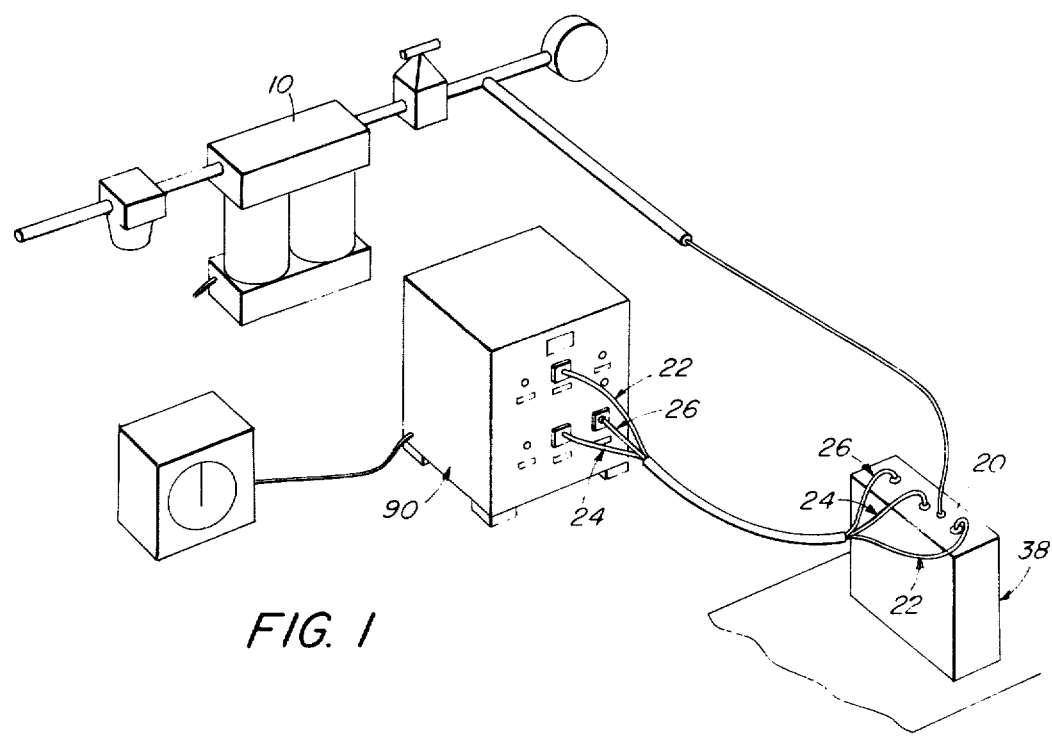
FIG. 1 is a general schematic illustration of a dehydrator, an optical head, and a console, incorporating the features of the invention.

In FIG. 1 a dehydrator 10, such as a Howell Laboratory, Inc., Model No. 1026 Dehydrator, having a capacity of one standard cubic foot per minute at 60 pounds per square inch gauge and a normal operating pressure of 60–125 pounds per square inch gauge is shown in combination with an optical head 20 and an electrical console 90.

The optical head 20 is shown connected to the console 90 by an input optical fiber 22, a reference optical fiber 24, and a measuring optical fiber 26.

OPTICAL HEAD

Referring to FIG. 2, where the optical head is shown in greater detail, the optical fibers are received in threaded fiber mounts 28, 30 and 32, respectively. A 45° right prism half-silvered beam splitter 34 is secured to a beam splitter mount 36, which is threaded to the rear wall 38. A focusing lens 40 is rigidly secured to a mount 42, which mount 42 is threaded to the back wall 38. An aperture stop 44, having a dimension of 0.238 × 0.475 inches is secured to the output side of the mount 42. A reflecting mirror 46 is received in a mirror mount 48 and the mirror mount 48 is secured to the back wall 38.

The bottom 50 of the optical head is characterized by an opening 52, through which the transmitted beam from the mirror 46 passes through. A reflecting mirror 54 receives the reflected beam from the surface of the web, and is secured to a mount 56, which mount is threadily engaged to the back wall 38. A lens 60 is received within mount 58, and an aperture plate or a receptor window 62 is secured to the input side of the mount 58.

A reference prism 64 is secured to a mount 66 which reference prism is in optical alignment with the prism 34 and the reference fiber optic 24.

A purge gas inlet 68 passes through the top wall 70 of the optical head and communicates with the dehydrator 10. Baffles 72 and 74 are secured to the back wall 38, contact bottom step 75, and define the chambers for the flow of the purge gas.

The baffle 72 is characterized by an oval slot 77, shown most clearly in FIG. 3. The baffle 72 is also characterized by a circular opening 78. Aperture plates 79a and b are slidably received in the slot 77 and are adapted for independent reciprocating movement therein. Each of the aperture plates 79a and b are characterized by slots 80a and b which register with threaded holes 82a and b in the baffle 76. Set screws 84a and b, FIG. 2, are received within the holes 82a and b; and the aperture plates 70a and b may be positioned within the slot 76 within the limits defined by the slots 80a and b.

ELECTRICAL CONSOLE

Figure 5:
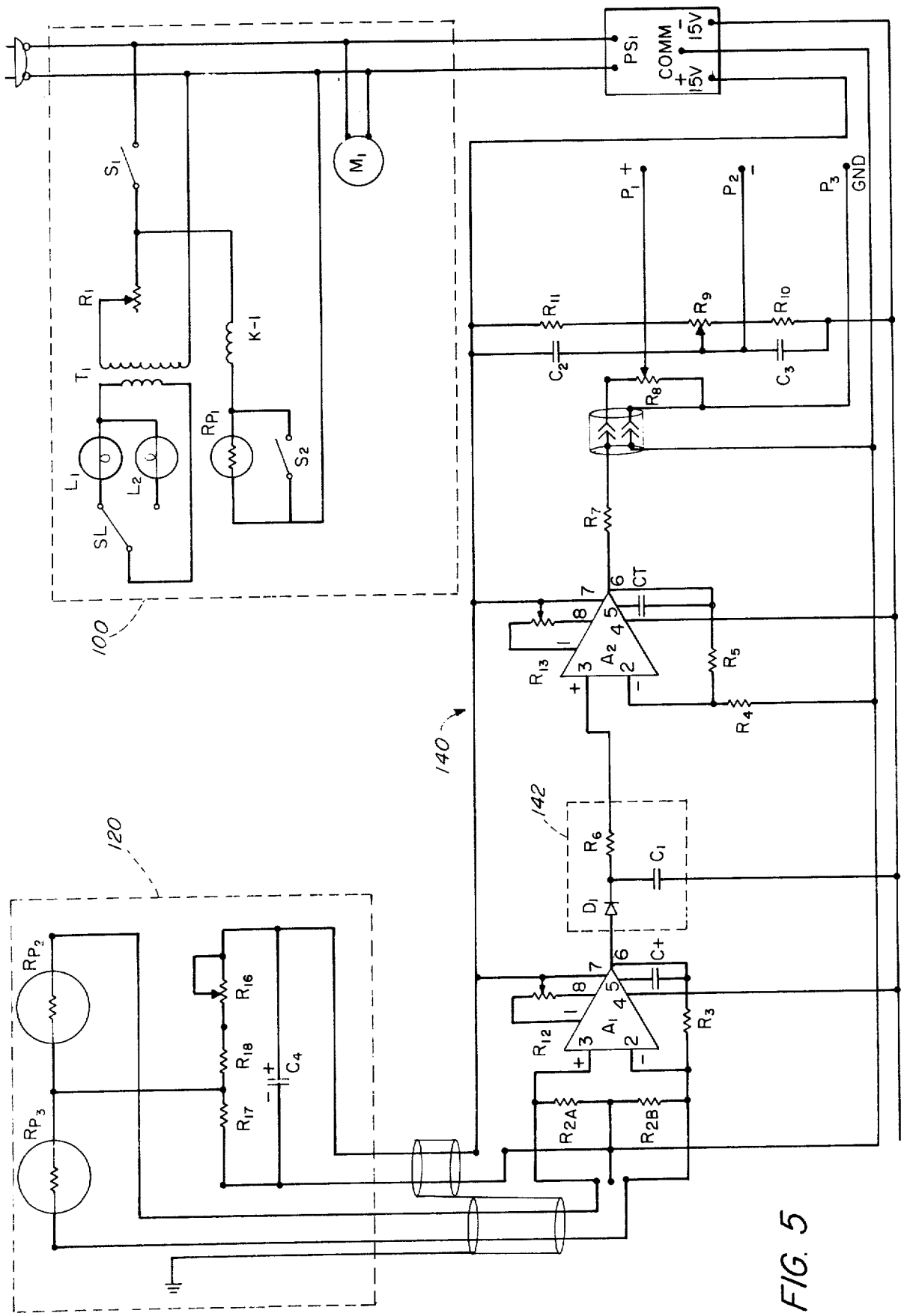
FIG. 5 is a circuit diagram of the electrical console.

The electrical console 90 includes three sections outlined in dotted lines in FIG. 5, the lamp system 100, the photocell module 120, and the signal processing module 140.

The lamp system 100 includes lamps L-1 and L-2, which comprise secondary and primary lamps in combination with a relay SL, a transformer T-1 and a rheostat R-1. Switch S-1 communicates with the rheostat R-1, a coil relay K-1, a photoresistor $RP_1$, and a switch $S_2$. A fan motor M-1, such as the mini-boxer, is used to cool the lamp module 100 and modules 120 and 140.

The photocell module 120 essentially provides a balanced input circuit. Photoresistor $RP_2$ and $RP_3$ receive the reflected and reference beams from the fiber optics 24 and 26. These photoresistors $RP_2$ and $RP_{30}$ convert changes in light energy to changes in electrical resistance. The power is supplied to the photocell module by the power supply PS-1, such as a Philbrick 2204 to provide a plus and minus 15 volt range. The function of resistors R-16, 17, and 18 and capacitor C-4 will be described in detail in the description of the operation of the invention.

The signal processing module 140 includes a differential amplifier A-1 and resistors R-12, R-3, and capacitor CT, which control the offset voltage and the gain of the differential amplifier A-1.

A sample-and-hold circuit 142 comprises diode D-1, capacitor C-1, and resistor R-6, which circuit is responsive to the output from the amplifier A-1.

A differential amplifier A-2 is in electrical communication with the sample-and-hold circuit 142, and includes a capacitor $C_t$, resistors R-13, R-4, and R-5 to control its offset voltage and gain.

The output from differential amplifier A-2 is controlled in a predetermined range by a resistor R-7 and a potentiometer R-8. Resistor R-10 and R-11 in combination with a potentiometer R-9 are adapted to adjust the zero voltage for calibration of the instrument.

OPERATION

The operation of the invention will be described in reference to the measurement of the gloss of the surface of a moving web of coated paper, which surface for illustrative purposes should have a gloss of 50.

The optical head 20 is rigidly mounted above a plane through which the surface of the moving web would pass under ideal conditions. A standard plate calibrated at 50 gloss is placed in the measurement plane defined by the optical system of the optical head. The total distance from the aperture plate 44 to the sample surface and back to the aperture plate 62 is 8 inches, a distance which conforms to the TAPPI Standard 480. The measuring plane would be ⅛ inch from the plate 50.

The electrical console is powered simply by connecting it to standard line current. The transformer T-1 in the light module 100 reduces the line current to 26 VAC. The variable potentiometer R-1 reduces the voltage to approximately 14 volts and serves to prolong lamp life and improve overall glossmeter lineality at higher gloss readings. Switch S-1 is closed powering lamp L-1, which is a tungsten halogen bulb such as Sylvania ENB-EKE. Switch S-2 is depressed momentarily, allowing current to pass through relay coil K-1, lighting lamp L-2, and extinguishing lamp L-1. Photocell $RP_1$ is illuminated by lamp L-2, and while L-2 is radiating the photocell $RP_1$ will hold the current through the relay coil K-1.

If lamp L-2 fails, the current is released through relay coil K-1 and lamp L-1 is then actuated. This feature of the invention insures that if glossmeter readings are being taken during a mill run there is no loss because of down time in order to replace a lamp.

The fiber optic cable 22, for example a Dolan-Jenner Bt-824, transmits light energy at an intensity of 60 ft. candles to the optical head 20.

The dehydrator 10 is actuated, a purged gaseous stream is generated, and the purge gas enters the optical head at 68. The purge gas flows primarily about the baffles 72 and 74, contacting the surfaces of the mirrors and lenses, and out through the aperture 52 in the base of the optical head 20. FIG. 4 clearly shows one section of the flow path of the purge gas. This continual flow of the purge gas through the optical head, across the surfaces of the optical components, and outwardly from the optical head into the surrounding environment insures that no particulate matter such as dust or clay can accumulate on any of the surfaces. It should be noted also that the optical head is designed such that even though there is a flow of air through the chamber in which the reference beam is received and transmitted back to electrical console, this chamber has been isolated from the surrounding environment.

The light energy passes through the fiber optic 22 and enters the optical head as shown in FIG. 2. The light energy is emitted from the end of the optic fiber 22 as a beam of light energy in a wavelength range of visible light with a center frequency of about 5,300°A and at a intensity of approximately 60 ft. candles. The beam strikes the surface of the 45° half-silvered beam splitter 34, whereby approximately 35 percent of the beam is directed to the lens 40 and approximately 35 percent is directed to the prism 64. The beam which is directed to the prism 64 is the reference beam, and is directed back to the end of the fiber optic 24 and the light energy is transmitted to the photocell module 120 in the electrical console, specifically to the photoresistor $R_p3$. The measuring beam passes through the lens 40 and through the aperture 44, which in this embodiment is dimensioned at 0.238×0.475 inches. The measuring beam then strikes the mirror 46, is directed to the surface of the standard gloss plate rated at 50 gloss, is reflected back to the mirror 54, and through the condensing lens 60, where it is focused on the end of the fiber optic 26. The light energy of the reflected measuring beam is then transmitted to the photoresistor $RP_2$, shown in FIG. 5.

The photoresistors $RP_2$ and $RP_3$ are thus illuminated by the radiation from the measuring beam and reference beams, respectively.

The value of R-17, FIG. 5, at 100 ohms, is much less than the combined shunt resistance of $RP_2$, $R_{2A}$, $RP_3$, and $R_{2B}$ which is 250 K ohms at dark side, approximately 30 K ohms at full light, such that the input voltage to the sensing circuits is insensitive to changes in the photoresistors $RP_2$ and $RP_3$. The electrical resistance of the resistors $R_{2A}$ and $R_{2B}$, which is 2 K ohms, is also much less than the minimum value of the photoresistors $RP_2$ and $RP_3$, which is 60 K ohms at full lighted state. In this embodiment, the resistors $R_{2A}$ and $R_{2B}$ are equal in value at 2 K ohms each.

The electrical console operates in the following manner. The voltage developed across resistor $R_{2A}$ is proportional to the resistance of $R_{2A}$ divided by the sum of the resistances of the photoresistor $RP_2$ and the resistance value $R_{2A}$, which results in a voltage across $R_{2A}$ proportional to the ratio of the resistance $R_{2A}$ and the photoresistor $RP_2$ when the value of $R_{2A}$ is much smaller than $RP_2$. Since the resistance across the photoresistor $RP_2$ is inversely proportional to the level of illumination of the photoresistor, then the voltage across the resistor $R_{2A}$ is directly proportional to that level of illumination. Thus, the non-inverting the inverting inputs to the differential amplifier A-1 experience voltages proportional to the levels of illumination in the measuring and reference photocells $RP_2$ and $RP_3$ respectively. The output of the differential amplifier A-1 is directly proportional to the difference between the measuring and the reference signals. The resistors R-3 2M ohms, R-12 10 K ohms, and capacitor C+ 390 picofarads are used to control the offset voltage and gain of the amplifier A-1 within the range of 5mV and 60dB respectively.

The output of the differential amplifier A-1 is fed into the sample-and-hold circuit 142, which comprises capacitor C-1, diode D-1 and resistor R-6 10 M ohms so as to charge capacitor C-1 to a higher value whenever the voltage applied to the anode of the diode D-1 exceeds the voltage level applied to the cathode of the diode D-1 by the capacitor C-1, the charging time constant being one millisecond in this embodiment. The capacitor C-1 can discharge only through the high impedance resistor R-6 plus the input impedance of the differential amplifier A-2, which is 20 megohms. The voltage across the capacitor C-1 decays very slowly. In the present embodiment, the discharging time constant is about 5 seconds. Thus, the voltage corresponding to a true glossmeter reading is stored on capacitor C-1 and is available continuously as the output of A-2. Of course, the discharging time constant may be varied as desired.

The differential amplifier A-2 comprises resistors R-4 1 M ohms, R-5 1 M ohms, R-13 10 K ohms, and a capacitor $C_f$ of 390 microfarads, which is used to control the offset voltage and gain within the limits of ± 5mV and 6dB respectively. The output from the differential amplifier A-2 passes through resistor R-7 6.2K ohms, and potentiometer R-8, which are used to produce the range of voltage from 0 to 5 VDC, corresponding to a range of gloss from 0 to 100, that is applied to a recorder or external indicator such as Honeywell or Foxboro Recorder. The resistors R-10 50 K ohms, and R-11 50 K ohms, and the potentiometer R-9 are used to adjust the output corresponding to any desired gloss value to zero, the capacitors C-2 and C-3 of 25 microfarads each being used to minimize noise in the circuit.

To calibrate the instrument, a volt meter, such as a Simpson 260 (not shown) is applied between P-1, the positive gloss output, and P-3, the ground of the instrument. The set screws 84a or b in the optical head (one or both may be adjusted as desired) are loosened, and one or both of the plates 79a and b ) are adjusted to control the intensty of the reference beam passing from the 45° mirror 34 to the reference mirror 64 and back to the fiber optic 24, which provides the light intensity to the photoresistor $RP_3$. This vernier adjustment is continued until the voltage observed on the voltmeter is zero, thus electrically balancing the circuit by optical attenuation. The circuits are now balanced in the operating range, the signals from the reference and measuring photocells being equal. First order errors are also cancelled.

With a gloss plate of 50, the voltage across $RP_2$ would be $1.25 \times 10^{-3}$ volts. Optically attenuating the reference signal adjusts the voltage across $RP_3$ to $1.25 \times 10^{-3}$ volts. The output of the differential amplifier A-1 would be 0 volts and the output of the sample-and-hold circuit to the differential amplifier A-2 would be 0 volts.

The recording instrument 13, such as a Honeywell recorder is applied between P-1 and P-2, the positive and negative gloss outputs, and the potentiometer R-9 is adjusted until the gloss reading corresponding to the value of 50 gloss is observed. This would result in an output of +2.5 volts. Specifically, the needle tracing across a chart would reset upon a line identified as 50. A second gloss standard in the "black" gloss region at approximately 100 gloss, is now placed in the measuring plane and potentiometer R-8 is adjusted until the gloss reading corresponding to the standard being used is observed. Specifically, the needle across the chart would now rest upon or near the 100 line. This would result in an output at $P_1$, $P_2$ of 5 volts. In this calibration, the glossmeter will now register from o–5 volts for gloss values ranging from 0–100 gloss.

The glossmeter may also be used in a differential mode, in which the potentiometer R-9 is adjusted until the gloss reading observed for the 50 gloss standard is 0. Gloss values greater or less than the 50 gloss standard will then appear as positive or negative voltages, respectively.

Figure 6:
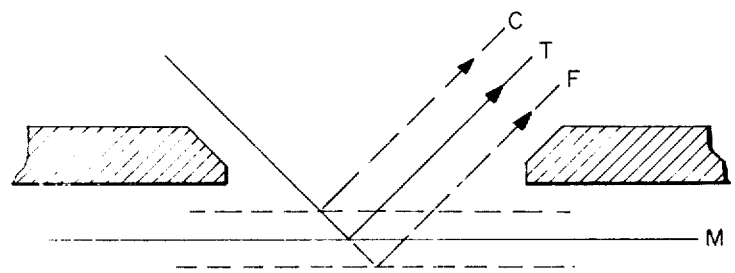
FIG. 6 is an illustration of incident beams reflected from a moving web.

The instrument now having been calibrated and registering from 0 to 5 volts for gloss values ranging from 0–100 gloss, the paper web is now passed from one roll to another, such as during a production run. When the surface is in the measuring plane as previously described, the maximum reading is obtained, or a maximum voltage is provided, which corresponds directly to the intensity of the reflected beam received by the fiber optic 26. Referring to FIG. 6, the measuring plane is shown as M, which plane has been defined by the lenses, mirrors, and apertures of the optical head in conformance with the TAPPI Standard 480. During the calibration, the surface of the 50 gloss standard is held precisely in the measuring plane, so that the maximum reading is obtained. This is indicated schematically by the solid lines showing incident and reflected beams and identified as T. When the incident beam strikes the surface at the defined measuring plane, the maximum amount of reflectance is provided, thereby providing a maximum reading. If, because of web flutter, during a production run, the surface being measured moves closer to the optical head, then the reflected beam shown in the dotted lines and identified as C does not strike the reflecting mirror 56 at the angle and location as designed, and therefore the intensity of the reflected beam received when it is not in the actual measuring plane is less than the intensity of a corresponding beam in the measuring plane. Also, if the surface of the web is further away from the base of the optical head as identified by the dotted line F, then again the reflected beam or energy does not strike the mirror 56 in the location as designed and the intensity received is again less than that if it had been in the measuring plane.

Figure 7A:
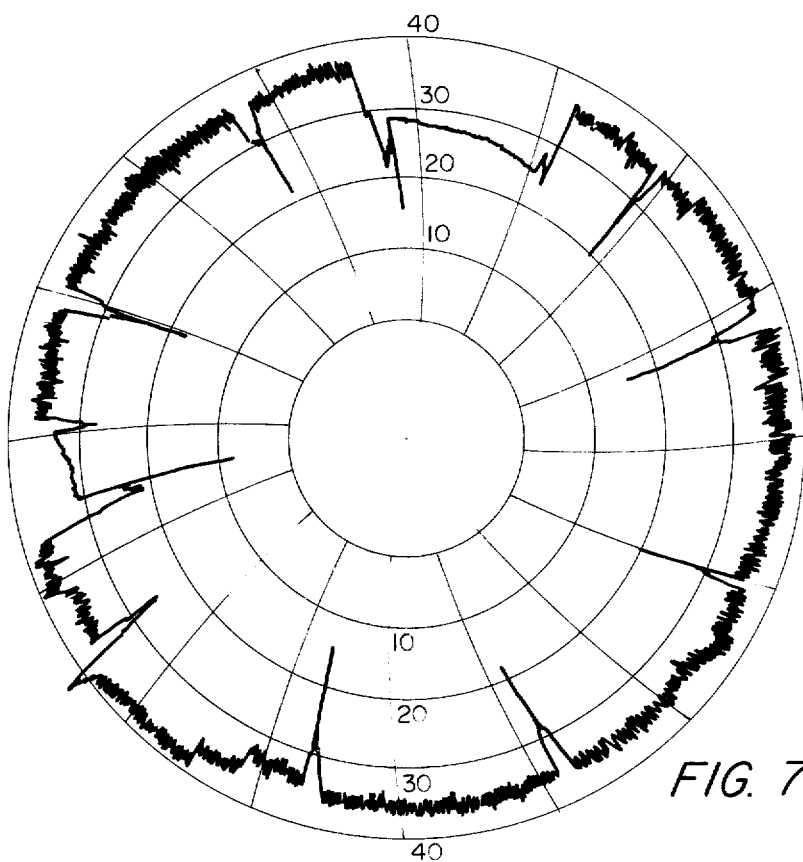
FIG. 7a and b illustrate gloss measurements of a prior art glossmeter and the glossmeter of the preferred embodiment.
Figure 7B:
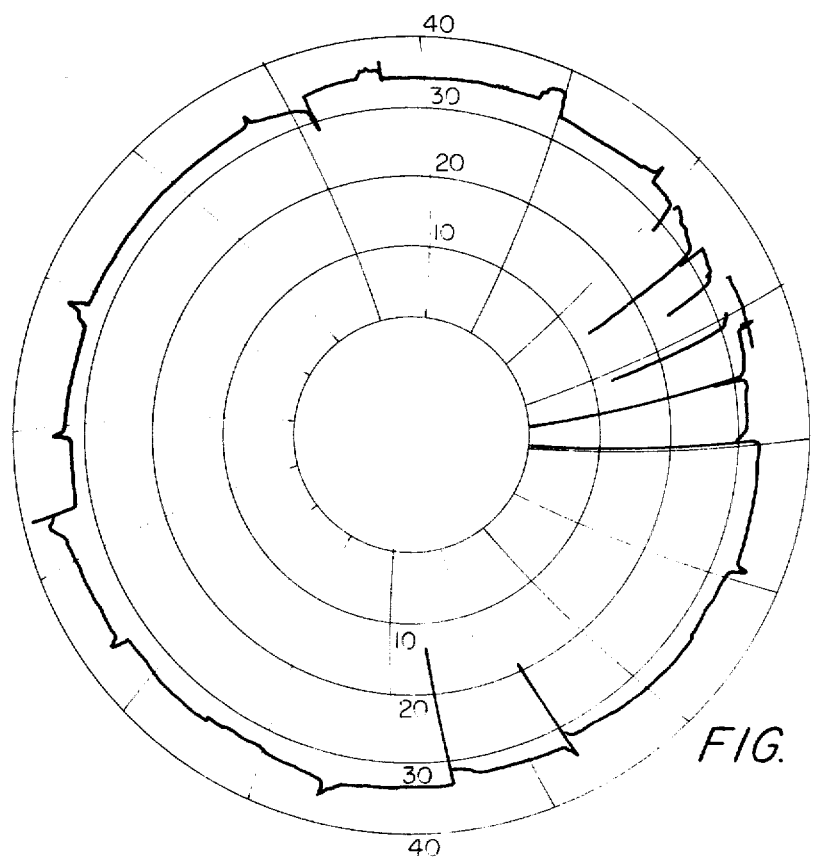

The sample-and-hold circuit 142 insures that within a period of about 5 seconds, only those maximum values recorded will actually be reflected as the output of the signal processing module. The non-maximum values or those which do not correspond to values of the surface as it lies in the measuring plane, will be disregarded. The 5-second delay on the sample-and-hold circuit was selected in that it is known that with the web flutter for a particular run, the surface the gloss of which is being measured will pass into and out of the measuring plane at least two to three times, but, in any event, at least one every 5 seconds. This insures that the maximum value is held for this period until the next time the surface being measured passes through the measuring plane. Of course, if the gloss of the paper continually increases or decreases, then a new maximum value will be established. But in any event, a linear output is provided and the flutter is eliminated. In FIG. 7a is shown the result of a prior art recorder which clearly shows the variations caused by web flutter; in FIG. 7b, a recording of the present invention provides a linear output and only selects those maximum values corresponding to the gloss surface in the measuring plane.

The present invention has been described in reference to spectral gloss measurements of coated paper complying with TAPPI Standard 480. The instrument may be modified in its illuminating and viewing characteristics for various gloss measurements. The angular relationship and dimensions of the optical systems may be varied to define other measuring planes and the meter used to measure the reflectance of the gloss of other surfaces, such as paints, enamels, other paper products, textiles, plastics, etc.

If instrument air is available, then a dehydrator need not be used. Depending upon the use of the meter, any gaseous flow may be used within the scope of this invention. Further, the baffles may be dimensioned to establish any desired flow path.

Where the electrical components are separated in a different module from the optical head, as in the present invention, fiber optics have been used to transit the light energy. Of course, other methods of transmitting this light energy, such as through the use of beams, may be used, when one module is fixed and the other is resiliently mounted. Also, the invention has been described wherein the source of radiant energy was light energy within a specific wavelength. The source of energy may be ultraviolet, infrared, white, and of any wavelength. The reflected beam has been compared against the reference beam. The invention broadly includes any absorption of energy which may be measured, such as transmission, fluorescence, or quenching. Further, the specific sample-and-hold circuit has been shown, but other functionally equivalent circuits may, of course, be used, or those circuits identified as peak-picking circuits may also be employed. The invention may be used in the laboratory or pilot plant runs, or production runs, and further, any type of recorder, whether analog or digital may be used in combination with this invention.

Having described our invention, what we now claim is:

1. A glossmeter which comprises:
   means to measure continuously the gloss of a surface of a web, and to provide a continuous electrical signal corresponding to the gloss of the measured surface;
   means to define a measurement plane through which the web moves into and out of, the signals from the surface of the web corresponding to a true gloss reading when the web is in said measurement plane; and
   means to select for recording only those signals of the continuously transmitted signals corresponding to the value of the gloss from the surface of the web passes through the measurement plane.

2. The glossmeter of claim 1, wherein the means to select includes means to pick the signal corresponding to the true gloss reading of the surface and to store said signal for a predetermined period of time.

3. The glossmeter of claim 2, wherein the means to pick and store includes a sample-and-hold circuit.

4. The glossmeter of claim 1, which includes means to provide a reference beam and a measuring beam, the measuring beam striking and emerging from the surface to be measured.

5. The glossmeter of claim 4, which includes means to attenuate the reference beam.

6. The glossmeter of claim 5, which includes means to attenuate optically the reference beam.

7. The glossmeter of claim 4, which includes means to receive the reference and measuring beams and to provide an output directly proportional to the difference between said beams.

8. The glossmeter of claim 7, wherein the means to receive the reference and measuring beams includes photocells in combination with a first differential amplifier.

9. The glossmeter of claim 8, which includes a sample-and-hold circuit which receives the output of the first differential amplifier.

10. The glossmeter of claim 9, which includes a second differential amplifier adapted to receive the output of the sample-and-hold circuit.

11. The glossmeter of claim 10, wherein the output of the second differential amplifier is a voltage.

12. The glossmeter of claim 1, which includes:
    a source to provide a beam of energy;
    means to split the beam of energy into a reference beam and a measuring beam;
    first receiving means in optical alignment with the splitting means to receive the reference beam and direct the reference beam to a reference receptor;
    second receiving means in optical alignment with the splitting means to receive the measuring beam and direct it to the surface of the moving web;
    third receiving means to receive the measuring beam emerging from the surface of the moving web and to direct it to a measuring receptor; and
    means to compare the signals received by the reference and measuring receptors.

13. The glossmeter of claim 12, wherein the reference and measuring receptors are photocells.

14. The glossmeter of claim 12, wherein the second and third receiving means define the measurement plane.

15. The glossmeter of claim 1, which includes means to purge the optical components of the glossmeter.

16. The glossmeter of claim 15, wherein the glossmeter includes baffles disposed therein to define a conduit through which the purge gas flows.

17. A glossmeter which comprises:
A. means to provide a reference beam and a measuring beam, the measuring beam striking and emerging from the surface of a web to be measured;
B. means to define a measurement plane through which the web moves into and out of, the signals from the surface of the web corresponding to a true gloss reading when the surface of the web is in said measurement plane; and
C. means to measure continuously the gloss of the surface of the web which includes:
1. means to receive the reference and measuring beams and to provide an output corresponding to the difference between said beams; and
2. means to select for recording only those output signals corresponding to the value of the gloss on the surface of the web as it passes through the measurement plane.

18. The glossmeter of claim 17, wherein the means to measure includes:
photocells adapted to receive the reference and measuring beams and to provide an output directly proportional to the difference between said beams;
a first differential amplifier adapted to receive said output; and
a sample-and-hold circuit adapted to receive the output of the first differential amplifier and to output to a second differential amplifier only those signals corresponding to the gloss of the surface of the web as it passes through the measurement plane.

19. The glossmeter of claim 17, which includes means to purge the optical components of the glossmeter.

20. The glossmeter of claim 17, wherein the means to provide the reference and measuring beams and the means to define the measurement plane includes:
means to split a beam of energy into a reference and a measuring beam;
first receiving means in optical alignment with the splitting means to receive the reference beam and direct the reference beam to a reference receptor;
second receiving means in optical alignment with the splitting means to receive the measuring beam and direct it to the surface of the web;
third receiving means to receive the measuring beam emerging from the surface of the moving web and direct it to a measuring receptor; and
means to compare the signals received by the reference and measuring receptors.

21. A method of measuring the gloss of a moving surface which includes:
measuring continuously the gloss of a surface;
providing a continuous signal corresponding to the gloss of a measured surface; and
selecting for recording only those signals of the continuously transmitted signals corresponding to the value of the gloss as the web passes through the measurement plane.

22. The method of claim 21 which includes holding for a predetermined period of time those signals selected corresponding to the maximum gloss reading.

23. The method of claim 21, which includes:
providing a reference beam;
providing a measuring beam;
comparing the measuring and reference beams;
producing an output proportional to the difference between the measuring and reference beams; and
selecting for recording only those output signals of the continuously transmitted signals corresponding to the value of the gloss as the web passes through a measurement plane.

24. The method of claim 23, which includes optically attenuating the reference beam prior to the producing the output proportional to the difference between the reference and measuring beams.

25. The method of claim 21, which includes purging the optical surfaces of the glossmeter.

* * * * *